US009622277B1

(12) United States Patent
Sun et al.

(10) Patent No.: US 9,622,277 B1
(45) Date of Patent: Apr. 11, 2017

(54) COORDINATING BACKHAUL LINKS BETWEEN GROUND STATIONS AND AIRBORNE BACKHAUL NETWORK

(71) Applicant: X Development LLC, Mountain View, CA (US)

(72) Inventors: Zhifeng Sun, Bellevue, WA (US); Jun Gong, San Jose, CA (US); Fei Ye, Mountain View, CA (US); Jeff Gilbert, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 80 days.

(21) Appl. No.: 14/746,464

(22) Filed: Jun. 22, 2015

(51) Int. Cl.
*H04W 4/00* (2009.01)
*H04W 76/02* (2009.01)
*H04W 64/00* (2009.01)
*H04W 84/06* (2009.01)

(52) U.S. Cl.
CPC ....... *H04W 76/022* (2013.01); *H04W 64/003* (2013.01); *H04W 84/06* (2013.01)

(58) Field of Classification Search
None
See application file for complete search history.

(56) References Cited

U.S. PATENT DOCUMENTS

| 5,832,379 A | 11/1998 | Mallinckrodt |
| 7,366,125 B1 | 4/2008 | Elliott |
| 8,493,889 B2 | 7/2013 | Wittenschlaeger |
| 9,281,554 B1 * | 3/2016 | Behroozi ................. H01Q 1/28 |
| 2006/0178141 A1 * | 8/2006 | McGuffin ............. G08G 5/0013 455/431 |
| 2010/0281100 A1 * | 11/2010 | Benco ................ B64D 11/0015 709/203 |
| 2011/0182230 A1 | 7/2011 | Ohm et al. |
| 2011/0286325 A1 | 11/2011 | Jalali et al. |
| 2012/0281672 A1 | 11/2012 | Ohm et al. |
| 2014/0105054 A1 | 4/2014 | Saegrov et al. |
| 2016/0365917 A1 * | 12/2016 | Small ................... H04W 64/00 |

FOREIGN PATENT DOCUMENTS

EP    2207275 A2 *   7/2010   ......... H04B 7/18506

* cited by examiner

*Primary Examiner* — Otis L Thompson, Jr.
(74) *Attorney, Agent, or Firm* — McDonnell Boehnen Hulbert & Berghoff LLP

(57) ABSTRACT

A method for matching a ground station to an aerial vehicle for establishment of a backhaul link to an airborne network involves: (i) determining location information for a ground station that is configured to provide a backhaul link to an airborne mesh network, (ii) determining flight data for one or more of the aerial vehicles in the airborne mesh network, (iii) based at least in part on the combination of (a) the location information for the ground station and (b) the flight data for the one or more of the aerial vehicles, selecting a flight with which the ground station should establish a backhaul link to the airborne network, and (iv) generating a link-assignment message that comprises instructions for the ground station to establish a backhaul link between the ground station and an aerial vehicle carrying out the selected flight.

21 Claims, 6 Drawing Sheets

GROUND STATION DATA

| GS-ID | Location | Elevation | Timestamp | Flight ID |
|---|---|---|---|---|
| | | | | |
| | | | | |
| | | | | |

FIG. 5A

FLIGHT DATA

| Balloon ID | Flight ID | Timestamp | Flight Data |
|---|---|---|---|
| | | | |
| | | | |
| | | | |

FIG. 5B

COORDINATING BACKHAUL LINKS BETWEEN GROUND STATIONS AND AIRBORNE BACKHAUL NETWORK

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

Example embodiments relate to airborne networks formed by aerial vehicles; and, in particular, to balloon networks formed by high-altitude balloons. Such an airborne network may function to extend the reach of and/or fill coverage gaps in other data networks such as the Internet. Accordingly, an operator of such an airborne network and/or other parties may implement terrestrial access networks and/or terrestrial gateways to other data networks. In an example implementation, certain ground stations may function as switches that can establish wireless backhaul links to aerial vehicles in the airborne network. Configured as such, a ground station can connect the terrestrial access networks and gateways to the airborne network via a backhaul link to an aerial vehicle in airborne network.

In an example embodiment, the balloons in a balloon network may travel horizontally over the surface of the earth, such that a given balloon can move into and out of the wireless-communication range of a ground station. Accordingly, example embodiments provide methods and systems for matching particular ground stations to particular flights of the aerial vehicles in an airborne network for purposes of establishing backhaul links.

In one aspect, backhaul link assignment system includes a first communication interface that is operable to receive flight data for a plurality of aerial vehicles in an airborne network, wherein the flight data comprises a plurality of flight entries corresponding to flight paths of the aerial vehicles; and a control system. The control system is configured to: (i) access a ground-station database that comprises data entries for a plurality of ground stations, wherein each ground station is configured to provide, for at least one other ground-based device, a backhaul link to the airborne network, and wherein the data entry for each ground station comprises location information for the ground station; (ii) for at least one of the ground stations, carry out a matching process to select an aerial vehicle for the ground station, wherein the matching process comprises use of both (a) the location information for the given ground station and (b) at least some of the flight data for the plurality of aerial vehicles as a basis to select a flight with which the given ground station should establish a backhaul link to the airborne network; and (iii) generate a link-assignment message that comprises instructions for the at least one ground station to establish a backhaul link to the airborne network via the selected flight path.

In another aspect, disclosed herein is a method for matching a ground station to an aerial vehicle for establishment of a backhaul link to an airborne network. The method involves a computing system: (i) determining location information for a ground station, wherein the ground station is configured to provide, for at least one other ground-based device, a backhaul link to an airborne mesh network comprising a plurality of aerial vehicles; (ii) determining flight data for one or more of the aerial vehicles in the airborne mesh network; (iii) based at least in part on the combination of (a) the location information for the ground station and (b) the flight data for the one or more of the aerial vehicles, selecting at least one aerial vehicle with which the ground station should establish a backhaul link to the airborne network; and (iv) generating a link-assignment message that comprises instructions for the ground station to establish a backhaul link between the ground station and the selected aerial vehicle.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 5A is a table showing a possible schema for ground station data, according to an example embodiment.

FIG. 5B is a table showing a possible schema for flight data, according to an example embodiment.

DETAILED DESCRIPTION

Figure 1:
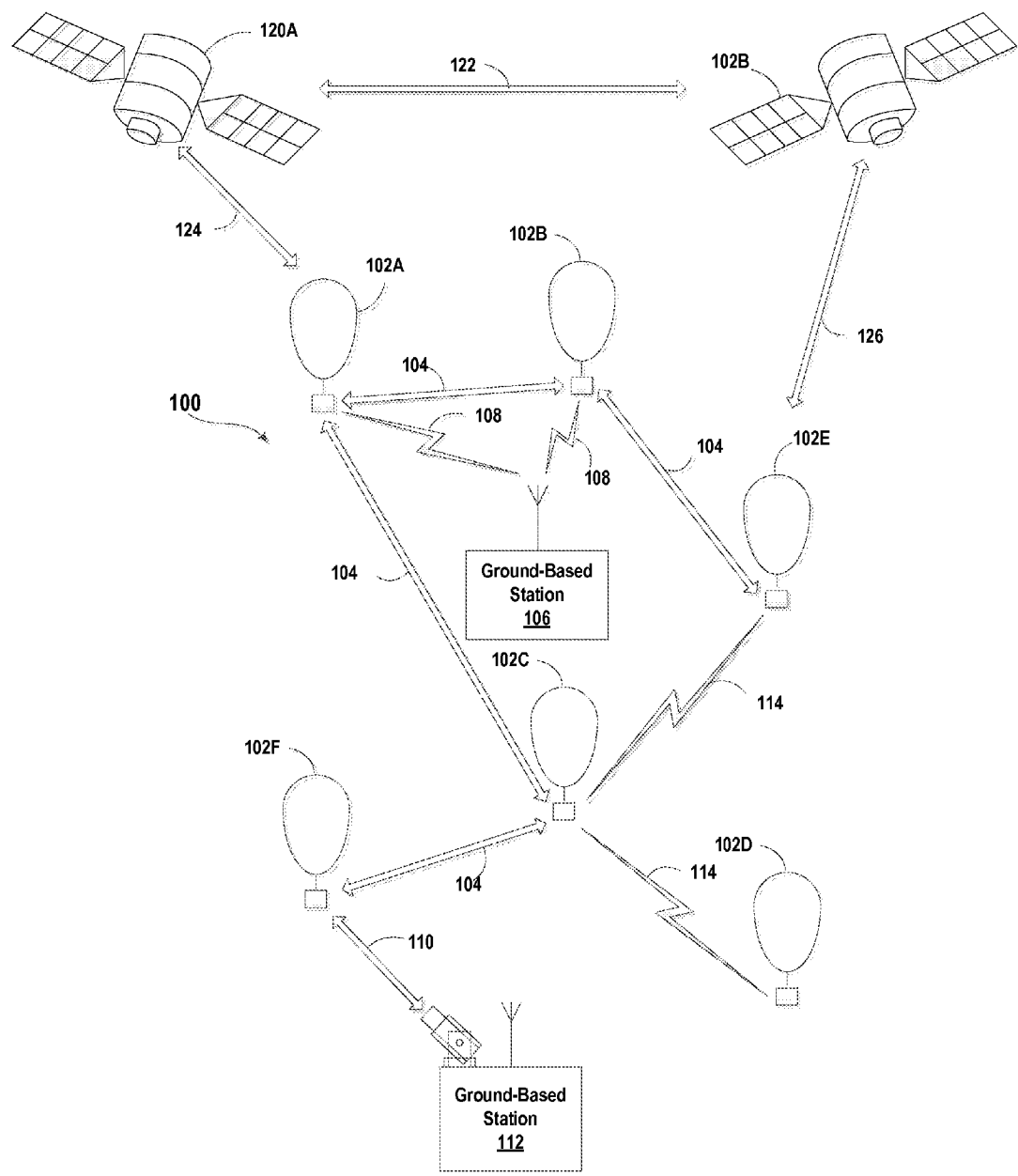
FIG. 1 is a simplified block diagram illustrating a balloon network, according to an example embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

I. Overview

Illustrative embodiments may generally relate to a data network formed by balloons, and in particular, to a mesh network formed by high-altitude balloons deployed in the stratosphere. In order that the balloons can provide a reliable mesh network in the stratosphere, where winds may affect the locations of the various balloons in an asymmetrical manner, the balloons in an exemplary network may be configured move latitudinally and/or longitudinally relative to one another by adjusting their respective altitudes, such that the wind carries the respective balloons to the respectively desired locations.

In an example balloon network, the balloons may communicate with one another using RF communications and/or free-space optical communications. For instance, the balloons may be configured for optical communications using ultrabright LEDs or lasers for optical signaling (although regulations for laser communications may restrict laser usage). In addition, the balloons may communicate with terrestrial stations, which may also be referred to as ground stations, using radio-frequency (RF) communications.

In an example embodiment, the balloon network may be part of a larger network topology that also includes ground stations. Further, some ground stations may function as switches, which each serve to connect an access network to the balloon network via a wireless backhaul link. More specifically, ground stations may be installed at fixed locations (or could also be mobile, in some implementations), and may connect to access points that allow client devices to connect, as well to network entities from other networks. Configured as such, backhaul links from these ground-stations to the balloon network may connect the balloon network to other types of networks, such as the Internet and/or cellular networks Since the balloons are in motion, it would be beneficial to have techniques that dynamically assign balloon flights to ground stations for purposes of backhaul communications. More specifically, ground stations may have directional antennas for wireless backhaul communications to the balloon network; for example, using Long Term Evolution (LTE) or millimeter wave communication protocols. Further, balloons can and often will move in and out of range of different ground stations, such that ground stations will from time to time need to teardown a backhaul link with a balloon that has or is about to move out of range, and/or establish a new backhaul link with a balloon that has moved into range.

As such, example embodiments may provide a central database with up-to-date balloon flight information and ground-station information, as well as a centralized backhaul matching system for assigning flights to ground-stations for purposes of backhaul communications. To do so, the backhaul matching system may gather flight information (e.g., telemetries) of airborne balloons via satellite links, or possibly directly from the balloons. Further, in some embodiments, the backhaul matching system can also maintain a database of ground station status and/or other information related to ground stations.

Further, example embodiments may include a service layer with multiple interfaces for different types of ground stations. In particular, service-layer interfaces may support application programming interfaces (APIs) for both "in-network" ground stations (e.g., those are operated by the same operator as the balloon network) and third-party ground stations. As such, both in-network and third party ground stations may send queries to the backhaul matching system via the service-layer interfaces. The backhaul matching system may then choose the "best" matching balloon (or flight) according to various factors.

In some embodiments, the central backhaul matching system may determine which flight the ground station should connect to, rather than determining the particular balloon to connect to. In such embodiments, the backhaul matching system may instruct the ground station as to how the ground station should orient its antenna establish a backhaul link with the balloon carrying out the assigned flight, rather than instructing the ground station to connect to a particular balloon. Further, the backhaul matching system may instruct the ground station as to how the ground station should move its antenna in order to maintain a backhaul link with the balloon carrying out the assigned flight, as the balloon moves. For example, the backhaul matching system may use a flight ID for the assigned flight to look up flight data (e.g., location, trajectory, speed, etc.), and then use the flight data and location data for the ground station to determine and provide instructions as to how the ground station should orient its antenna so that it is aligned with whatever balloon is carrying out the assigned flight. Configured as such, the backhaul matching system may control some, and perhaps all, of a ground station's operations.

An implementation in which the control of the ground station antennas for a balloon network is moved to a central backhaul matching system may provide certain benefits over an implementation in which ground station antennas are independently operated by each ground station. For example, centralized control of ground station antennas may reduce the complexity of software stacks for the ground stations, and allow for stateless operation of the ground station antennas; alleviating the need for a given ground station to have any knowledge of other ground station switches for the balloon network.

Note that example embodiments are not necessarily limited to balloons and/or balloon networks. It is anticipated that the system and processes that are described in reference to balloons and/or balloon networks may be extended to other types of manned or unmanned aerial vehicles and/or to networks of other types of manned or unmanned aerial vehicles, without departing from the scope of the invention. Those skilled in the art will understand that embodiments and features that are described by way of example with reference to balloons, can also be applied in the context of other types of aerial vehicles, including but not limited to drones or UAVs.

II. Illustrative Balloon Networks

In some embodiments, a high-altitude-balloon network may be homogenous. More specifically, in a homogenous high-altitude-balloon network, each balloon is configured to communicate with nearby balloons via free-space optical links and/or other types of wireless links. Further, some or all of the balloons in such a network, may also be configured communicate with ground station(s) using RF communications links and/or other types of wireless communication. For example, balloons may communicate with ground stations over LTE links and/or millimeter wave (mmW) communication links.

In other embodiments, a high-altitude-balloon network may be heterogeneous, and thus may include two or more different types of balloons. For example, some balloons may be configured as super-nodes, while other balloons may be configured as sub-nodes. (Note also that some balloons may be configured to function as both a super-node and a sub-node.) In such a configuration, the super-node balloons may be configured to communicate with nearby super-node balloons via RF links and/or free-space optical links, and to communicate with ground-based backhaul stations via optical and/or mmWave links (and possibly via RF links as well). However, the sub-node balloons may not be configured for optical or mmWave communication with ground-based backhaul stations, and may only be configured for RF air-to-ground communications (or might not be configured for air-to-ground communications at all). Further, other combinations of different types of balloons are possible in a various network configurations.

FIG. 1 is a simplified block diagram illustrating a balloon network 100, according to an exemplary embodiment. As shown, balloon network 100 includes balloons 102A to 102F, which are configured to communicate with one another via free-space optical links 104. Configured as such, balloons 102A to 102F may collectively function as a mesh network for packet-data communications. Further, balloons 102A to 102F may be configured for RF communications with ground stations 106 via RF links 108.

In an exemplary embodiment, balloons 102A to 102F are high-altitude balloons, which are deployed in the stratosphere. In an exemplary embodiment, balloons 102A to 102F may generally be configured to operate at altitudes between 17 km and 22 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 22 km may vary with latitude and by season, the variations can be modeled in a reasonably accurate manner. Additionally, altitudes above 17 km are typically above the maximum flight level designated for commercial air traffic. Therefore, interference with commercial flights is not a concern when balloons are deployed between 17 km and 22 km.

To transmit data to another balloon, a given balloon 102A to 102F may be configured to transmit an optical signal via a communication link 104. In an exemplary embodiment, a given balloon 102A to 102F may use one or more RF transmitters, receivers, and/or transceivers to communicate with other balloons. Alternatively, some or all of balloons 102A to 102F may include high-power light-emitting diodes (LEDs) and/or laser systems for communication over communication links 104. Additional details of balloons implementations are discussed in greater detail below, with reference to FIG. 3.

In a further aspect, balloons 102A to 102F may utilize one or more of various different RF air-interface protocols for communication ground stations 106 via RF links 108. For instance, some or all of balloons 102A to 102F may be configured to communicate with ground stations 106 using protocols described in IEEE 802.11 (including any of the IEEE 802.11 revisions), various cellular protocols such as GSM, CDMA, UMTS, EV-DO, WiMAX, LTE, and/or one or more propriety protocols developed for balloon-to-ground RF communication, among other possibilities.

Further, in some embodiments, balloons may use millimeter wave bands for RF communications with ground stations 106. For instance, example configurations may utilize spectrum in the 71-76, 81-86 and/or 92-95 GHz bands for high-bandwidth point-to-point communications between a balloon and a ground station (it is noted that these frequencies do require a transmitting license from the FCC). Links utilizing these bands may provide a bandwidth of 10 Gbit/sec. Further, in some configurations, a small 100 MHz range that has been reserved for space-borne radios may also be used for communications between a balloon and a ground station. Other configurations for communications between a balloon and a ground station are also possible.

Ground stations, such as ground stations 106 and/or 108, may take various forms. Generally, a ground station may include components such as transceivers, transmitters, and/or receivers for communication via RF links and/or optical links with a balloon network. Further, a ground station may use various air-interface protocols in order to communicate with a balloon 102A to 102E over an RF link 108. As such, a ground station 106 may be configured as an access points via which various devices can connect to balloon network 100. Ground stations 106 may have other configurations and/or serve other purposes without departing from the scope of the invention.

In further aspect, in order to provide Internet and/or other types of wireless data service in remote locations, balloon network 100 may function as a backhaul network. Configured as such, balloon network 100 may extend the reach of and/or fill coverage gaps in other data networks such as the Internet. Accordingly, some ground stations 106 may function as gateways or switches, which allow for communications from other data networks to be routed to and from the balloon network 100.

Further, terrestrial access networks may be implemented to provide terrestrial client devices with access to balloon network 100. For example, wireless and/or wired access points (not shown) may be installed in various locations throughout a given geographic area. The terrestrial access points in a given geographic area may all be communicatively coupled to a ground station 106, which operates as a switch or gateway for the access points in the geographic area. When configured as a switch, a ground station 106 may establish a backhaul link to the balloon network 100, such that communications from access points and/or other data networks can be routed through the balloon network 100.

In a further aspect, a balloon network 100 may optionally be operable for communications with a satellite network, which can include any number of space-based satellites 120A and 120B. The satellites can be of any suitable type. Examples of suitable types of satellites include communications satellites, navigational satellites, Earth observation satellites, weather satellites, or a combination or a variation of such satellites. In FIG. 1, the satellite network 520 is shown to include two satellites, namely satellites 120A and 120B, for ease of explanation.

Generally, the satellites 120A and 120B may be configured for relatively long-range communication with each other, with high-altitude balloons 102A to 102F, and with ground stations. In particular, the satellite 120A may be operable to communicate with the satellite 120B by way of the communication link 122, and with the balloon 102A by way of the communication link 124. Similarly, the satellite 120B may be operable to communicate with the satellite 120A by way of the communication link 122 and with the balloon 102E by way of the communication link 126. Note that a given balloon may move over time to a location where it no longer has a line-of-sight to a satellite that the balloon was previously able to communicate with. Thus, as balloons and satellites move over the surface of the earth, a given balloon may tear down and establish communication links with different satellites. In a further aspect, satellites 120A and 120B may be operable communicate with ground stations, such as the ground station 106 or ground station 112, by way of communication links, although the communication links are omitted from FIG. 1 to simplify the illustration.

The satellites 120A and 120B can use any suitable communication protocol and frequency range for communicating with one another. For example, the satellites 120A and 120B can communicate with one another in the radio frequency range. As another example, the satellites 120A and 120B can communicate with the use of lasers. These examples are illustrative only; the satellites 120A and 120B can communicate in any way that is currently known in the art or is yet to be known in the art.

In addition, the satellites 120A and 120B can use any suitable communication protocol and frequency range to communicate with high-altitude balloons (and other aerial vehicles), and/or with ground stations. For example, the satellites 120A and 120B can communicate with the balloons and ground stations in a suitable microwave range. An example of a suitable microwave range is the IEEE E-Band, which includes 70-90 GHz. Other suitable microwave ranges may include the IEEE C-band, which corresponds to a frequency range of 4-8 GHz, and/or the IEEE $K_u$ band, which corresponds to a frequency range of 12-18 GHz. Other examples are also possible.

In a further aspect, a flight-data publishing system (not shown in FIG. 2) may gather flight (e.g., telemetry) data from the balloons 102A to 102F in a balloon network, and make the flight data available to other systems. For example, balloons 102A to 102F may send flight data to a ground-based flight-data publishing system via a satellite network. For example, a given balloon may periodically send its current flight data to a satellite 120A, which may then route the flight data to a ground-based flight-data publishing system. Further, the flight data reported by a given balloon may include location, trajectory, speed, measured wind conditions, air temperature, atmospheric pressure, and/or operational status of various balloon systems, among other possibilities.

A. Mesh-Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data direct to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

Further, in order to operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an exemplary balloon network 100 may apply a mesh protocol to update the state of the network as the topology of the network changes. For example, to address the mobility of the balloons 102A to 102E, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102E may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for improving QoS may be employed when determining a lightpath. Other techniques are also possible.

B. Dynamic Topology of Balloon Network

In an exemplary embodiment, the topology of an exemplary balloon network may be dynamic and adaptable. In particular, example balloons 102A to 102F may move with winds in the stratosphere. As such, movement in different directions may be achieved by increasing or decreasing a balloon's altitude, such that the balloon is at an altitude with a desired wind direction and/or speed. For example, one or more balloons could move to new positions to increase or decrease the density of balloons in a given area. In such a configuration, balloons may be in continuous or nearly continuous motion, and the movement of balloons may be controlled or influenced according to various constraints, such as a desired network topology and/or desired coverage of the balloon network.

For example, movements of balloons 102A to 102F may be coordinated in order to maintain and/or move balloons into a certain positions relative to one or more other balloons in the network (and possibly in a certain position relative to the ground). Additionally or alternatively, movements of balloons 102A to 102F may be coordinated in order to meet certain coverage requirements or goals in various geographic areas.

The desired topology of a balloon network may vary depending upon the particular implementation. In some cases, balloons may be controlled in an effort to provide a substantially uniform topology. In such case, balloons 102A to 102F (or a control system for the balloons) may implement functions to position the balloons at substantially the same distance (or within a certain range of distances) from adjacent balloons in the balloon network 100. Note that because balloons may be in nearly continuous motion (e.g., being moved by winds in the stratosphere), balloons may maintain a uniform topology while collectively moving over the earth. In such embodiments, the movement of balloons may be such that balloon(s) move into a particular geographic area as other balloon(s) move out of the particular geographic area, in an effort to provide continuous coverage from the balloon network in the particular geographic area.

In other cases, a balloon network 100 may have a non-uniform topology. For instance, exemplary embodiments may involve topologies where balloons area distributed more or less densely in certain areas, for various reasons. Note that in such embodiments, there may be substantially uniform topologies of different densities in different sub-areas within the larger coverage area of the balloon network. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

C. Control of Balloons in a Balloon Network

Figure 2:
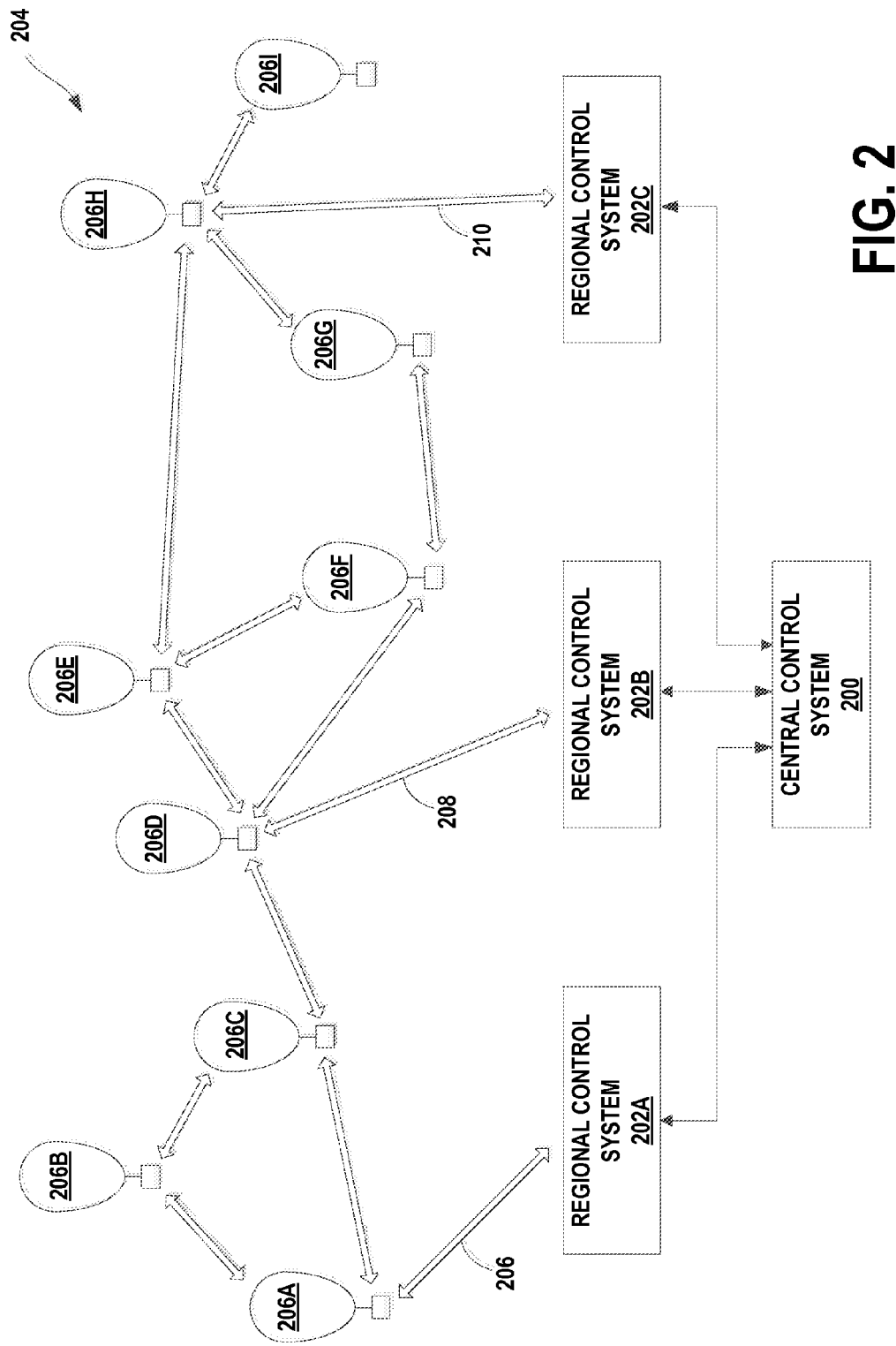
FIG. 2 is a block diagram illustrating a balloon-network control system, according to an example embodiment.

In some embodiments, control of the balloons in a balloon network may be centralized. For example, FIG. 2 is a block diagram illustrating a balloon-network control system, according to an exemplary embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, some or all balloons may be configured as to communicate with regional control systems 202A to 202C. Accordingly, each regional control system 202A to 202C may be configured to communicate with a balloon or balloons that are currently operating over its respective geographic area. For example, in the illustrated embodiment, balloons 204A, 204D, and 204H may communicate with regional control systems 202A to 202C, respectively, via optical links 206, 208, and 210, respectively.

Note that a regional control system 202A to 202B may in fact just be particular type of ground station that is configured to communicate with balloons (e.g., such as ground station 112 of FIG. 1). Thus, while not shown in FIG. 2, the control system shown in FIG. 2 may be implemented in conjunction with other types of ground stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate movements (e.g., flights) of balloons in balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other balloon control functions as well.

In an exemplary embodiment, a backhaul matching system may be implemented as part of a central control system 200. The backhaul matching system may utilize ground station information and flight data for the balloon network 204 to coordinate backhaul communications between ground stations and balloon network 204. To do so, the backhaul matching system may assign certain balloon flights to certain ground stations for backhaul communications, and may update these flight assignments as the topology of the balloon network changes over time. To facilitate this functionality, central control system 200 may also include a centralized database of flight data for the balloon network, and/or a centralized database of ground station information.

As noted, FIG. 2 shows a distributed-control arrangement, with regional control systems 202A to 202C coordinating communications between a central control system 200 and a balloon network 204. Such an arrangement may be useful in a balloon network that covers a large geographic area. In some embodiments, a distributed control system may even support a global balloon network that provides coverage everywhere on earth. Of course, a distributed-control arrangement may be useful in other scenarios as well.

Further, it should be understood that other control-system arrangements are possible. For instance, some implementations may involve a distributed control system with additional layers (e.g., sub-region systems within the regional control systems, and so on). Alternatively, control functions may be provided by a single, centralized, control system, which communicates directly with one or more downlink balloons. Moreover, control and coordination of a balloon network may be shared between a ground-based control system and a balloon network to varying degrees, depending upon the implementation.

D. Illustrative Balloon Configurations

Figure 3:
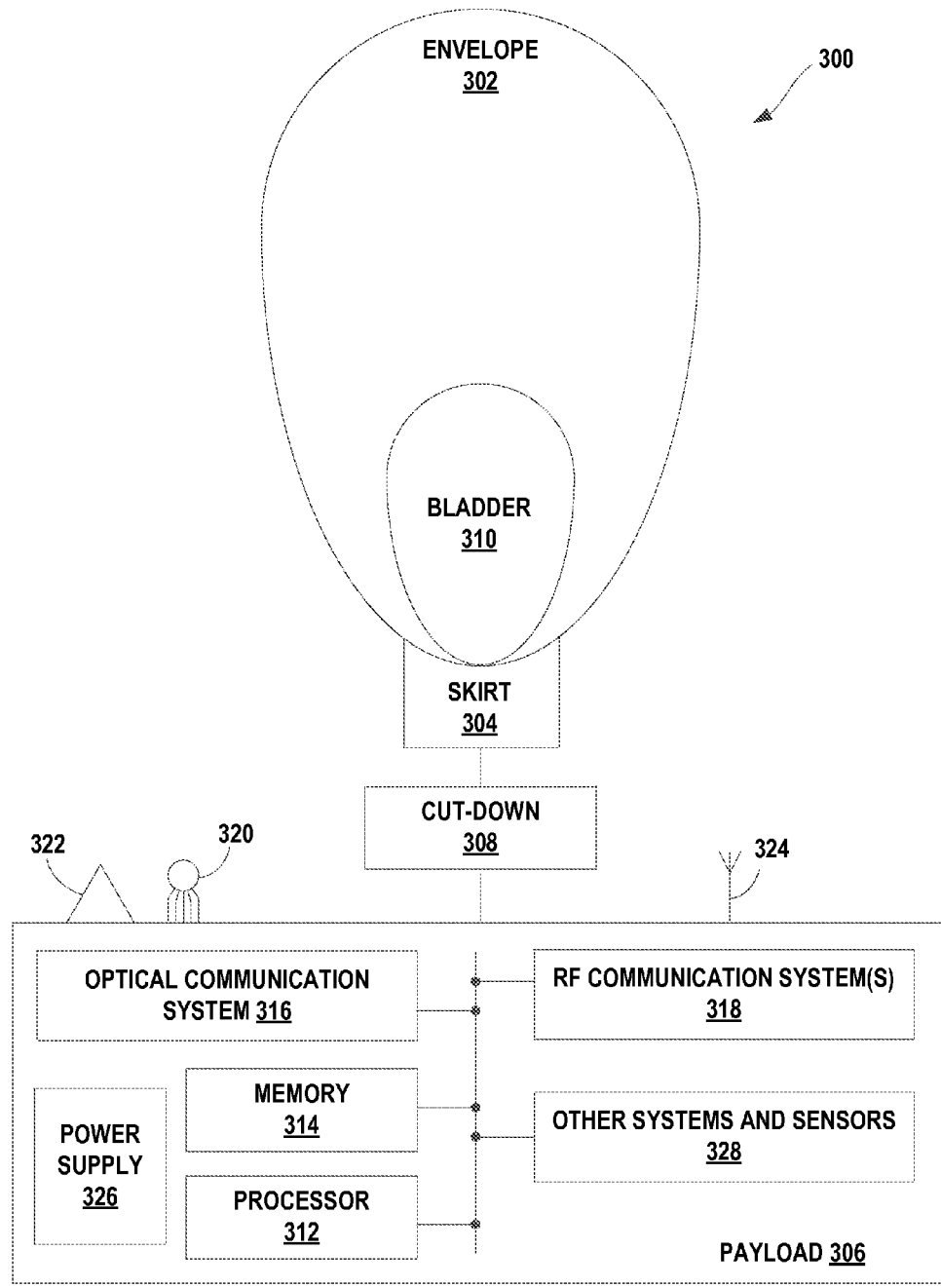
FIG. 3 is a simplified block diagram illustrating a high-altitude balloon, according to an example embodiment.

Various types of balloon systems may be incorporated in an exemplary balloon network. As noted above, an exemplary embodiment may utilize high-altitude balloons, which typically operate in an altitude range between 17 km and 22 km. FIG. 3 is a simplified block diagram illustrating a high-altitude balloon 300, according to an exemplary embodiment. As shown, the balloon 300 includes an envelope 302, a skirt 304, a payload 306, and a cut-down system 308 that is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photo-diode receiver system). Further, payload 306 may include an RF communication system(s) 318, which may transmit and/or receive RF communications via an antenna system 324. RF communication system(s) 318 may additionally or alternatively include an RF communication system for communications with ground stations, such as a wireless chipset and antenna for LTE and/or millimeter wave (mmW) communications, among other possibilities. The payload 306 may also include a power supply 326 to supply power to the various components of balloon 300.

Further, payload 306 may include various types of other systems and sensors 328. For example, payload 306 may include, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 306 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow air to escape from bladder 310.

Further, the balloon 300 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground.

Note that movement and locations of balloons, such as balloon 300, can vary since winds in the stratosphere may affect the locations of the balloons in a differential manner. A balloon in an example network may be configured to change its horizontal position by adjusting its vertical position (i.e., altitude). For example, by adjusting its altitude, a balloon may be able to find winds that will carry the balloon horizontally (e.g., latitudinally and/or longitudinally) to a desired horizontal location. Wind speed and/or direction may vary with altitude, and since current wind velocities as well as weather forecasts are available, in principle, a balloon may be directed to a location by identifying an altitude at which a wind direction takes a balloon to along a desired trajectory. However, a balloon without other forms of propulsion may be constrained to follow the wind and there may not be a single altitude with winds taking the balloon along the desired trajectory. In addition, to control a fleet of balloons, movement of the balloons should occur from one location above the surface of the Earth to another in a predictable manner.

III. Example Backhaul Matching Systems

Figure 4:
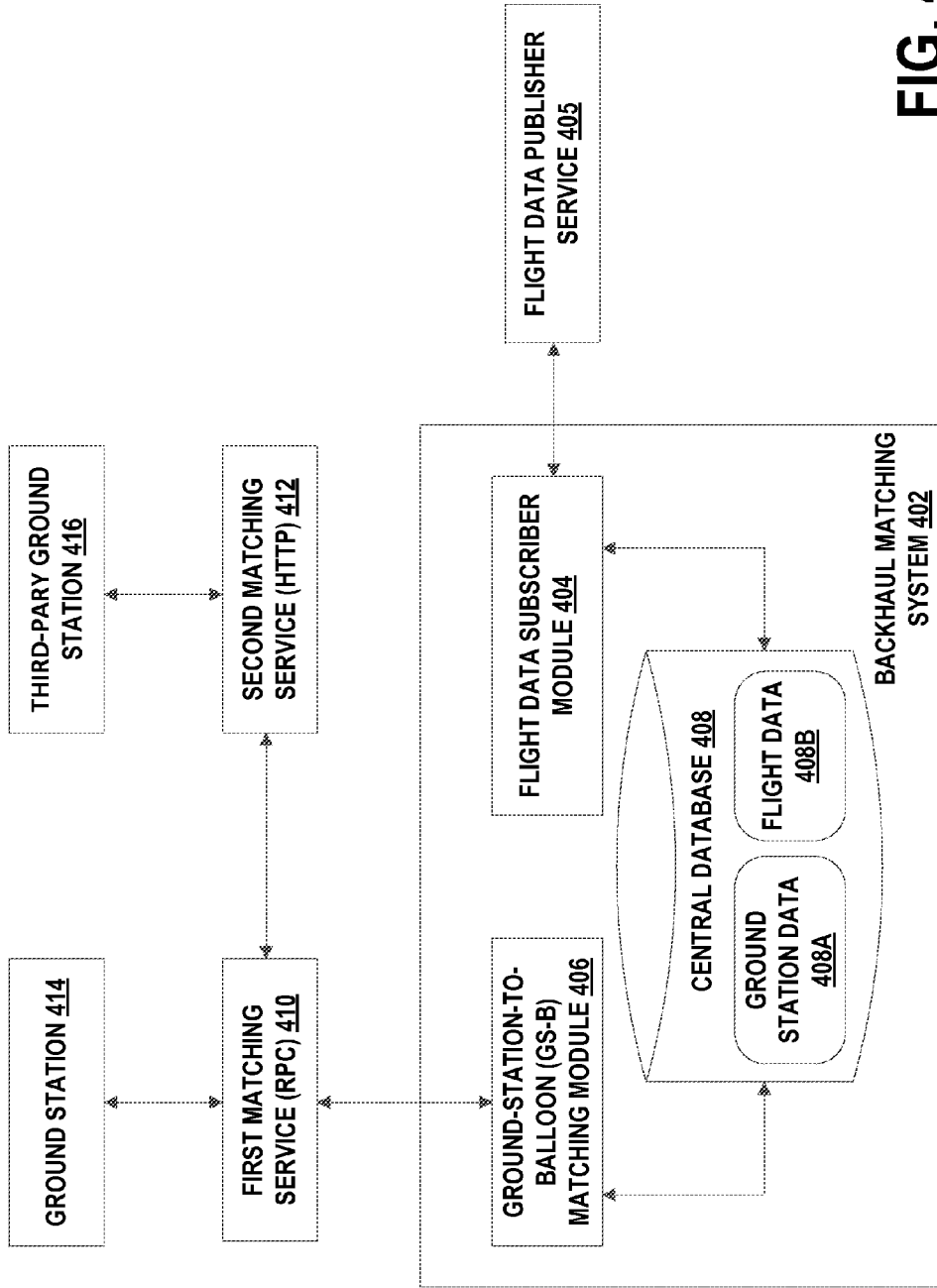
FIG. 4 is a simplified block diagram illustrating components of backhaul matching system, according to an example embodiment.

FIG. 4 is a block diagram illustrating components of backhaul matching system, according to an example embodiment. The backhaul matching system may be implemented as part of a central control system, such as central control system 200 shown in FIG. 2. However, other configurations for a backhaul matching system are also possible.

In the configuration shown in FIG. 4, backhaul matching system 402 includes a flight-data subscriber module 404 that is operable to receive flight data for a plurality of aerial vehicles in an airborne network (e.g., for balloons in a balloon network), and a ground-station-to-balloon (GS-B) matching module 406 that is operable to assign particular aerial vehicles to particular balloons for purposes of establishing a backhaul link to the airborne network. Further, in the illustrated example, the backhaul matching system 402 includes a central database 408 in which flight data 408B and ground station data 408A are stored. As such, a significant portion (and possibly all) of the data that is utilized for backhaul matching may be available at a central storage location.

To assign an aerial vehicle to a given ground station 414 for backhaul communications with an airborne network, GSB 406 may be operable to access the ground-station data 408A to determine location information for the given ground station. Further, GSB 406 may access the flight data 408B for the airborne network to determine flight information for at least some of the aerial vehicles in the airborne network (e.g., for the aerial vehicles that are within some distance from the ground station, and/or those with which the ground station has recently established a backhaul link). GSB 406 may then implement a matching process in which the GSB uses both (a) the location information for the given ground station and (b) the flight data for at least some of the aerial vehicles as a basis to select an aerial vehicle as a target for backhaul link between the given ground station and the airborne network. Details of example matching processes are described in greater detail in Section IV below.

In a further aspect, an example system may include service-layer components that provide an interface between backhaul matching system 402 and ground stations. In the illustrated example, a first matching service interface 410 and a second matching service interface 412 both provide interfaces via which ground stations can communicate with backhaul matching system 402. In an example embodiment, the first and second matching service interfaces 410 and 412 may provide utilize different communication protocols to provide interfaces that are accessible to different types or classes of ground stations.

As a specific example, the first and second matching service interfaces 410 and 412 may provide a private matching-service interface and a public matching-service interface, respectively. Configured as a private service-layer application, matching service interface 410 may provide an interface via which "in-network" ground stations that are operated by the operator of the airborne network (e.g., by the same service provider) can communicate with backhaul matching system 402. Accordingly, matching service interface 410 may utilize a communication protocol appropriate for private network communications. For example, matching service interface 410 may allow for remote procedure call (RPC) messaging with the backhaul matching system. Other examples are also possible.

Configured as a public service-layer application, matching service interface 412 may provide an interface via which third-party ground stations (e.g., that are operated by the operator of the airborne network) can communicate with the backhaul matching system 402. Accordingly, matching service interface 412 may utilize a communication protocol appropriate for public network communications such as standard hypertext transfer protocol (HTTP), among other possibilities.

In a further aspect, FIG. 4 shows an implementation where the second matching service interface 412 (e.g., a public matching service interface) operates as an HTTP proxy for the first matching service interface 410 (e.g., the private matching service interface). Configured as such, a private matching service interface can receive both direct communications from in-network ground stations, and indirect communications from third party ground stations via the public matching service interface. The private matching service interface can then relay either type of communication to backhaul matching system 402.

In an example embodiment, an application programming interface (API) may be defined, which specifies a set of operation s that allow a ground station to communicate with backhaul matching system 402 via a matching service interface (e.g., first matching service interface 410). Examples of such messages include: (a) a status message comprising status information related to a ground station, (b) a match request message to request an assignment of a flight with which to establish a backhaul link to the airborne network, and (c) a manual override request to override an assignment by the backhaul link assignment system, among other possibilities.

Further, an API may specify a set of operations for communications from backhaul matching system 402 to ground stations via a matching service interface (e.g., first matching service interface 410). Examples of such messages include: (a) a status request message to request that a ground station reply with a status message including updated information, (b) a match response message to indicate a flight assignment for backhaul communications with the airborne network, or to indicate that no assignment could be made, and (c) a manual override confirmation to confirm that a flight assignment has been made as requested in a manual override request, among other possibilities.

In an example embodiment, an API may be provided in the form of an RPC service component via which in-network ground stations can send and receive communications to backhaul matching system 402 via an RPC matching service interface. In such an embodiment, a "SendDishHeartbeat" API may provide a status message in the form of a "SendDishHeartbeatResponse" message. The SendDishHeartbeatResponse message may be used by a ground station to indicate that it is operational, and possibly to provide additional information related to its current operating state. A SendDishHeartbeat message may also include location information for the ground station, such as GPS location data and/or the latitude and longitude of the ground station. Correspondingly, a SendDishHeartbeatMessage may be defined, which allows the backhaul matching system 402 to request that a ground station send a SendDishHeartbeatResponse with updated status information.

Note that the naming convention for SendDishHeartbeatResponse and SendDishHeartbeatRequest messages may be particularly appropriate in an implementation where ground stations utilize antennas with parabolic reflectors, or dishes, for backhaul communications with the airborne network. It should be understood, however, that other types of status messages, and/or other naming conventions for a status message, are also possible.

In another aspect, a "GetMatchedFlight" API may provide a match request message in the form of a "GetMatchedFlightRequest" message. The GetMatchedFlightRequest message may be used by a ground station to request that it be assigned a flight with which to establish a backhaul link. As such, a GetMatchedFlightRequest message may include location information for the ground station, such as GPS location data and/or the latitude and longitude of the ground station.

Correspondingly, the GetMatchedFlight API may define a GetMatchedFlightResponse message, which the backhaul matching system 402 can send in response to a GetMatchedFlightRequest message. As such, a GetMatchedFlightResponse message may indicate the assigned flight (or perhaps just instructions for directing the ground station's antenna towards the assigned flight). Alternatively, a GetMatchedFlightResponse message could indicate that a GetMatchedFlightRequest was invalid, that there was an error when trying to assign a flight for backhaul link establishment, or that no flight is currently available for the ground station.

Further, in cases where a flight is assigned, the GetMatchedFlightResponse may identify the assigned flight by its flight identifier (flight ID). Alternatively, the GetMatchedFlightResponse might simply provide instructions for the ground station to direct its antenna towards the balloon that is carrying out the assigned flight. For example, such instructions might simply specify the appropriate angular orientation for the ground station's antenna. Further, in some implementations, instructions might indicate how the ground station should move its antenna over time, in order to follow the path of the flight (e.g., based on a flight trajectory). More generally, it should be understood that other types of match request and match response messages, and/or other naming conventions for such messages, are also possible.

In another aspect, a "PinFlightAssignment" API may provide a manual override message in the form of a "PinFlightAssignmentRequest" message. The PinFlightAssignmentRequest message may be used to manually override flight assignment; e.g., for testing and debugging purposes. As such, the PinFlightAssignmentRequest message may include a particular flight ID or airborne vehicle ID, which indicates the particular flight and/or aerial vehicle that the ground station would like to establish a backhaul link with. It should be understood that other types of manual override messages, and/or other naming conventions for a manual override message, are also possible. Further, it should be understood that other APIs for a backhaul matching system could define other types of operations, in addition or in the alternative to those that are described herein.

Further, in an example embodiment, the second (e.g., public HTTP) matching service interface 412 may expose the API (or perhaps just portions thereof) to third party ground stations, such that third-party ground stations can communicate with the backhaul matching system 402. Examples of such messages include: (a) a status message comprising status information related to a ground station (e.g., a SendDishHeartbeat message), (b) a match request to request an assignment of a flight with which to establish a backhaul link to the airborne network (e.g., a GetMatchedFlight message), among other possibilities. The second matching service interface may receive and forward such messages to the first (e.g., private) matching service interface.

Note that an example configuration with a private RPC interface and a public HTTP interface to the backhaul matching system may allow for more flexibile API implementation. Specifically, by utilizing a public HTTP matching service interface 412 in addition to a private RPC matching service interface 410, it may be easier for the operator of the airborne network to control which portions of the API are exposed to third parties. For example, either the first or second matching service interface may limit the functionality of an API that is available to third-party ground stations. As a specific example, the first and/or the second matching service interface may only process a PinFlightAssignment message, and perhaps other types of messages that are used to manually override flight assignment, when such message is received from an in-network ground station. Other examples are also possible.

In another aspect, an API may provide operations by which the backhaul matching system 402, or components thereof, may request information from and/or provide information to a ground station. For example, an API may define a status-request via which the backhaul matching system 402 can request that a ground station reply with an updated status message. As a specific example, an API may define a "SendDishHeartbeat" message, which may indicate to a ground station that the ground station should respond with As noted above, ground stations may utilize status messages and/or other types of messages to provide information that facilitates backhaul link assignment on their behalf by backhaul matching system 402. For example, a ground station may provide backhaul matching system 402 with: (a) a ground station identifier (GSID) that uniquely identifies the ground station, (b) location information, and (c) elevation information, among other possibilities. The backhaul matching system 402 may then utilize information received from ground stations to populate and/or update the ground station data 408A in central database 408.

For example, FIG. 5A is a table 500 showing a possible schema for ground station data 408A. As shown, the table includes the following types of data for each entry (e.g., each row in the table 500):

Ground Station Identifier (GS-ID): Each entry in table 500 may include a GS-ID that uniquely identifies the particular ground station to which Location: Each entry in table 500 may include location information, such as the latitude and longitude of the ground station. In an example embodiment where the ground stations include antennas with parabolic reflectors, the location information may indicate the center of the reflector.

Elevation: Each entry in table 500 may include an indication of the elevation at which the ground station is located. In an example embodiment where the ground stations include antennas with parabolic reflectors, the elevation may be set at the elevation of the point around which the reflector rotates.

Timestamp: Each entry in table 500 may include a timestamp that indicates the time of the latest update to some or all of the data in the entry.

Flight identifier (Flight ID): In an entry corresponding to ground station that has been assigned a flight for backhaul communications, the flight ID may indicate the flight identification number of the particular flight that is assigned to the ground station. The flight ID may be left blank if the corresponding ground station has not been assigned a flight for backhaul communications to the airborne network, or alternatively, could include some other type of indication that no flight is currently assigned.

In a further aspect, the backhaul matching system 402 may be configured to populate and/or maintain central database 408 with up-to-date flight data 408B. In order to maintain current flight data 408B in central database 408, flight-data subscriber module 404 may be operable to receive flight data for a balloon network from flight-data publisher service 405. In an example embodiment, the flight-data publisher service 405 may be a push server that sends out updated flight data from balloons as it is received. Alternatively, the flight-data publisher service 405 may send out updated flight data periodically, on an ad-hoc basis, and/or upon request from a subscriber (such as flight-data subscriber module 404).

In another aspect, flight-data publisher service 405 may continuously publish flight data on a Publish-Subscribe ("Pub/Sub") channel. As such, subscriber module 404 may listen to this pub/sub channel so that updated flight data is pushed to the subscriber module 404 as soon as it is available from flight-data publisher service 405. Accordingly, whenever flight-data subscriber module 404 receives new flight data (e.g., for a new or updated flight path of a balloon), the subscriber module 404 or another component of backhaul matching system 402 may update flight data 408B. Thus, in some embodiments, flight data 408B may be updated in real-time or near real-time. Alternatively, flight data 408B could be updated periodically and/or on an as-needed basis.

Note, however, that in some implementations, flight updates pushed from flight-data publisher service 405 may be received out of order due to the fact flight updates may be received via different network paths (and thus may experience different delays). In such case, flight-data subscriber module 404, or another control module in backhaul matching system 402, may be configured to cross-reference timestamps in the flight data 408B that is already stored in central database 408, before updating the central database with newly-received flight data.

FIG. 5B is a table 502 showing a possible schema for flight data 408B, which may be stored in central database 408. As shown, the table 502 includes the following types of data for each entry (with each entry being a row in the table 502):

Balloon Identifier (Balloon ID): Each entry in table 502 may include a Balloon ID that identifies the particular balloon (or aerial vehicle) that is associated with the flight. In practice, the balloon ID may actually identify the receiver on the balloon with which a ground station can establish a backhaul link. Note that in some embodiments, there may be multiple entries with the same balloon ID, since a balloon's receiver may be utilized for multiple flights.

Flight identifier (Flight ID): The flight ID indicates a flight identification number for a current flight of the balloon indicated in by the balloon ID in the same entry. In an example embodiment, flight IDs may be unique identifiers for flights. Alternatively, there could be multiple entries for the same flight in table 502, such as when different portions of a flight are carried out by different balloons, for example. In such case, the combination of the flight ID and the balloon ID may be used to uniquely identify the flight described by the data in given entry (e.g., in a particular row of table 502).

Timestamp: Each entry in table 502 may include a timestamp that indicates the time of the latest update to some or all of the data in the entry.

Flight Data Field: This field includes flight data, such as data that indicates trajectory, location at the time of the last report by the balloon, speed, waypoints, and/or other path information for a given flight ID, among other possibilities.

In an example embodiment, a balloon may include an iridium modem for satellite communications. In such an embodiment, an iridium modem identifier (IMEI) for a balloon's iridium modem may be used as the identifier for the balloon. As such, each row in table 502 may include an IMEI for the balloon that carries out the flight identified by the flight ID in the same row. Further, in some embodiments, iridium modems may be recovered and reused (e.g., when balloons are brought down for servicing and/or other reasons). For this and possibly other reasons, the same IMEI may be used for multiple flights, resulting in multiple rows of table 502 using the same IMEI. It should be understood that other types of balloon IDs could also be used, which may or may not have a one-to-one relationship with flight IDs, depending upon the particular implementation.

Note that the specific implementation shown in FIG. 4, which includes a flight-data subscriber module 404, is not intended to be limiting. More generally, a backhaul matching system may include any communication interface that is operable to receive flight data for aerial vehicles in an airborne network (e.g., such as from balloons in a balloon network). Other implementations for a backhaul matching system and variations on the implementation shown in FIG. 4 are also possible.

IV. Example Matching Processes

Figure 6:
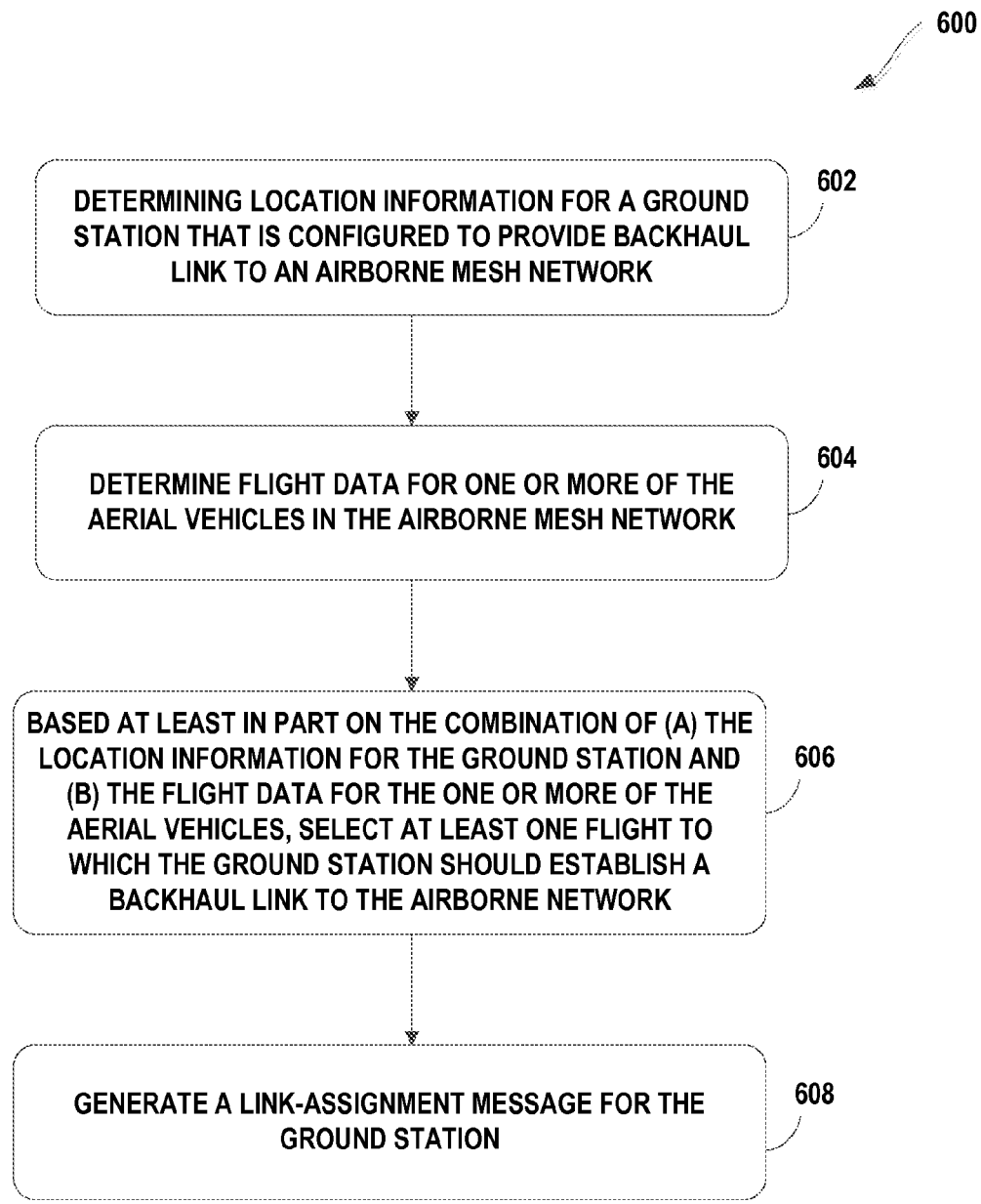
FIG. 6 is flow chart illustrating a method for matching a ground station to an aerial vehicle for establishment of a backhaul link to an airborne network, according to an example embodiment.

FIG. 6 is flow chart illustrating a method 600 for matching a ground station to an aerial vehicle for establishment of a backhaul link to an airborne network, according to an example embodiment. Exemplary methods such as method 600 may be implemented by backhaul matching system 402 (e.g., by one or more components thereof). Method 600 could also be implemented by one or more other entities in airborne network (which could be airborne or ground-based).

As shown by block 602, method 600 involves a matching system determining location information for a ground station that is configured to provide backhaul link to an airborne mesh network, such a balloon network. The matching system may also determine flight data for one or more of the aerial vehicles in the airborne mesh network, as shown by block 604. Then, based at least in part on the combination of (a) the location information for the ground station and (b) the flight data for the one or more of the aerial vehicles, the matching system selects a flight with which the ground station should establish a backhaul link to the airborne network, as shown by block 606. The matching system may then generate a link-assignment message for the ground station, as shown by block 608. Further, the matching system may send the link-assignment message to the ground station, so that it can act upon instructions and/or information in the link-assignment message.

In an example embodiment, the flight data determined at block 604 may include telemetry data from balloons in a balloon network. For example, at block 604, the backhaul matching system may determine the location, trajectory, speed, measured wind conditions, air temperature, and/or atmospheric pressure, for each of one or more balloons being considered for a given ground station. Additionally, flight data might provide the operational status of one or balloon systems of each balloon, among other possibilities.

A. Matching a Flight with a Given Ground Station

At block 606, various factors may be considered in the selection of a flight to assign to a given ground station for backhaul communications. Further, in example embodiments, a matching process may consider various combinations of factors, such as two or more of: (a) trajectory information for one or more of the aerial vehicles, (b) link capacity information corresponding to one or more of the aerial vehicles, and (c) demand for backhaul resources, as further bases for selecting the at least one aerial vehicle with which the ground station should establish the backhaul link to the airborne network. Other factors are also possible.

As noted, block 606 of the backhaul matching process may utilize the location information for a particular ground station to help determine a flight assignment for the particular ground station. In an example embodiment, the ground station's geographic location may be used to narrow the set of candidate flights. More specifically, block 606 may involve an initial determination of which flights have an associated location (e.g., a current or expected location of the balloon carrying out the flight) that is within some threshold distance from the geographic location of the particular ground station. Additionally or alternatively, block 606 may involve determining which flight(s) are being carried out by balloons that are expected to move to within a certain threshold distance from the particular ground station, within some predetermined period of time. As such, the backhaul matching process may narrow the candidates for assignment to the particular ground station by only considering flights that meet such distance-based criteria.

In an example embodiment, block 606 may further involve the use of trajectory information for one or more of the aerial vehicles in the airborne mesh network when selecting a flight to assign to a given ground station for backhaul communications. For example, the trajectory information may be considered an indication of the expected movement of a balloon carrying out the flight. Such trajectory information and/or other flight data may be compared for candidate flights, in order to determine a flight that best meets certain criteria, and/or to provide comparative measures for the flights, which may be weighed and considered along with other comparative measures. For instance, based on the trajectory and speed of each candidate flight, a backhaul matching system may determine which flight is expected be within range of the particular ground station for the greatest duration of time. The flight that is expected be within range of the particular ground station for the greatest duration of time may then be selected and assigned to the ground station for backhaul communications. Alternatively, the expected in-range duration of each flight may be used as one of multiple factors, such that having a greater expected in-range duration increases the likelihood that a given flight is selected, and vice versa.

In another aspect, an example matching process may also consider and utilize link-capacity information corresponding to one or more of the aerial vehicles, when selecting the particular aerial vehicle with which a ground station should establish a backhaul link. For example, block 406 may involve determining the total link capacity and/or the currently available link capacity (e.g., the current load) at the balloon that is currently carrying out each candidate flight. The respective measures of link capacity (or loading) at the corresponding balloon may then be considered as an additional factor in the selection of one of the candidate flights, such that having a greater available link capacity (or a lesser traffic load) increases the likelihood that a given flight will be selected, and vice versa. Note that consideration of link capacity and/or traffic load at a particular balloon may result in the selection of a flight that is currently further from the ground station and/or that has a shorter expected in-range duration (as compared to one or more other candidate flights). For example, when a balloon carrying out a first flight has a traffic level that is higher than the traffic level at a balloon carrying out a second flight, a ground station may be assigned even though the first flight has a shorter expected in-range duration than the second flight (e.g., when the difference in traffic levels outweighs the benefit of the second flight's longer expected in-range duration). Other examples are also possible. Note that link capacity data for the network may be stored in a central database along with flight data and/or ground-station data, or may be stored in other data storage arrangements.

In yet another aspect, an example matching process may consider and utilize a measure of demand for backhaul resources via a particular ground station, in the selection of a particular aerial vehicle with which the particular ground station should establish a backhaul link. For example, block 406 may involve determining the historical and/or expected level of backhaul communications via the particular ground station. Such a measure of demand may be utilized in the selection process in various ways. As one example, the amount of weight given to the comparative link capacity measures of flights may be varied according to the demand for backhaul resources via a particular ground station. In particular, when selecting a flight for a ground station having a lower level of demand for backhaul resources, the existing loads at the balloons corresponding to the candidate flights may be given less weight than when selecting a flight for a ground station having a higher level of demand for backhaul resources.

Further, in some embodiments, the backhaul matching process may implement a load balancing policy, such that the selection of flights to ground stations helps to balance the load resulting from backhaul communications across balloons in a balloon network. Such a load balancing policy may consider demand for backhaul resources at particular ground stations and/or existing loads at balloons in order to assign flights to ground stations in a way that is expected to result in a more equal distribution of traffic across the flights.

In a further aspect, an example backhaul matching process may take certain "geo-fencing" polices into consideration. A geo-fencing policy may be any policy that geographically restricts backhaul link assignment on a temporary or permanent basis. For example, a geo-fencing policy may define certain areas where a backhaul link should not be established, in order to avoid interface with existing backhaul links. Note that such a geo-fencing policy may be particularly useful when ground stations use mmW bands to establish backhaul links with balloons. Geo-fencing policies may also specify that backhaul links should not be established when balloons are moving into certain legally defined areas, such as certain countries. Such geo-fencing policies may also specify that a backhaul link should be torn down before the corresponding flight moves into a certain legally defined area (e.g., in order to prevent data from being transported out of or in to a particular country). Other geo-fencing policies are also possible.

B. Link-Assignment Messages

In example embodiments, the link-assignment message may include instructions for the ground station to establish a backhaul link between the ground station and a balloon carrying out the selected flight. For example, in some embodiments, the link-assignment message may include instructions as to how the ground station should orient its directional antenna towards the balloon carrying out the selected flight. As a specific example, the link-assignment message may indicate a rotation and azimuth angle at which the ground station should orient its directional antenna; or in other words, a rotation and azimuth angle such that the antenna is substantially directed towards the balloon carrying out the selected flight. Accordingly, a ground station may orient its antenna (e.g., a directional antenna having a parabolic reflector) as instructed, and then use the antenna to transmit backhaul communications to the balloon network. (Further, in some implementations, the antenna may also be used to receive communications from the balloon network.)

In some embodiments, a link-assignment message may also provide instructions as to how the ground station should move its antenna over time in order to maintain a backhaul link with a balloon during the course of the selected flight. To do so, a link-assignment message may indicate two or more orientations for the antenna, and a respective time at which the antenna should be moved into each of these orientations. Additionally or alternatively, the central backhaul matching system may send multiple link-assignment messages to a given ground station during the course of the selected flight, such that instructions are provided each time the ground station needs to reorient its directional antenna in order to maintain a backhaul link with the balloon carrying out the selected flight or establish a new backhaul link with a balloon carrying out a different flight. In any case, by following the instructions in a series of link-assignment messages, a ground station's directional antenna can follow a balloon as it moves during the selected flight.

In an alternative implementation, the link assignment message may include flight information for the selected flight, such that a ground station can determine how to orient its directional antenna towards the balloon carrying out the selected flight. Other formats and types of link-assignment messages are also possible.

V. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or nonvolatile storage systems. A computer readable medium may be considered a computer readable storage medium, for example, or a tangible storage device. Moreover, a block that represents one or more information transmissions may correspond to information transmissions between software and/or hardware modules in the same physical device. However, other information transmissions may be between software modules and/or hardware modules in different physical devices.

We claim:

1. A backhaul link assignment system comprising:
a first communication interface operable to receive flight data for a plurality of aerial vehicles in an airborne network; and
a control system that is configured to:
access a ground-station database that comprises data entries for a plurality of ground stations, wherein each ground station is configured to provide a backhaul link to the airborne network, and wherein the data entry for each ground station comprises location information for the ground station;
for at least one of the ground stations, carry out a matching process to select an aerial vehicle for the ground station, wherein the matching process comprises use of both (a) the location information for the given ground station and (b) at least some of the flight data for the plurality of aerial vehicles as a basis to select a flight with which the given ground station should establish a backhaul link to the airborne network; and
generate a link-assignment message that comprises instructions to the at least one ground station to establish a backhaul link to the airborne network via an aerial vehicle carrying out the selected flight.

2. The system of claim 1, wherein the plurality of aerial vehicles comprise a plurality of balloons.

3. The system of claim 2, wherein the plurality of balloons comprise a plurality of high-altitude balloons.

4. The system of claim 1, further comprising a flight-data subscriber module, wherein the flight-data subscriber module is configured to operate the first communication interface to receive to a flight-data feed that provides the flight data for the plurality of aerial vehicles in an airborne network.

5. The system of claim 4, wherein the flight-data subscriber module is further configured to update a central database based on the received flight data.

6. The system of claim 1, further comprising a first matching-service module, wherein the first matching-service module provides an interface for ground stations to communicate with the backhaul link assignment system.

7. The system of claim 6, further comprising a second matching-service module, wherein the first matching-service module provides an interface for ground stations of a first type to communicate with the backhaul link assignment system, and wherein the second matching-service module provides an interface for ground stations of a second type to communicate with the backhaul link assignment system.

8. The system of claim 7, wherein the first matching-service module supports one more of the following communication types for ground stations: (a) a status message comprising status information related to a ground station, (b) a match request to request an assignment of a flight with which to establish a backhaul link to the airborne network, and (c) a manual override message to override an assignment by the backhaul link assignment system.

9. The system of claim 7, wherein the second matching-service module supports one more of the following communication types for ground stations: (a) a status message comprising status information related to a ground station, (b) a match request to request an assignment of a flight with which to establish a backhaul link to the airborne network.

10. The system of claim 1, further comprising a private matching-service module and a public matching-service module, wherein the private matching-service module provides an interface for ground stations that are operated by the operator of the airborne network to communicate with the backhaul link assignment system, and wherein the public matching-service module provides an interface for third-party ground stations to communicate with the backhaul link assignment system.

11. The system of claim 8, wherein the public matching-service module operates as a proxy for the private matching-service module.

12. The system of claim 1, further comprising a central database, wherein the central database comprises: (a) the ground station database that comprises the data entries for the plurality of ground stations, and (b) a flight database that comprises the flight data for the plurality of aerial vehicles.

13. The system of claim 1, wherein, as part of the matching process, the control system is further configured to:
determine, from the flight data, trajectory information for one or more of the aerial vehicles; and
use the determined trajectory information as a further basis to select at least one aerial vehicle as the target for the backhaul link between the at least one ground station and the airborne network.

14. The system of claim 1, wherein, as part of the matching process, the control system is further configured to:
determine link capacity information corresponding to one or more of the aerial vehicles; and
use the determined link capacity information as a further basis to select at least one aerial vehicle as the target for the backhaul link between the at least one ground station and the airborne network.

15. The system of claim 1, wherein, as part of the matching process, the control system is further configured to:
determined a measure of demand for backhaul resources corresponding to the at least one ground station; and
use the measure of demand for backhaul resources as a further basis to select at least one aerial vehicle as the target for the backhaul link between the at least one ground station and the airborne network.

16. A method for matching a ground station to an aerial vehicle for establishment of a backhaul link to an airborne network, the method comprising:
determining, by a computing system, location information for a ground station, wherein the ground station is configured to provide a backhaul link to an airborne mesh network comprising a plurality of aerial vehicles;
determining, by the computing system, flight data for one or more of the aerial vehicles in the airborne mesh network;
based at least in part on the combination of (a) the location information for the ground station and (b) the flight data for the one or more of the aerial vehicles, the computing system selecting a flight with which the ground station should establish a backhaul link to the airborne network; and generating a link-assignment message that comprises instructions for the ground station to establish a backhaul link between the ground station and an aerial vehicle carrying out the selected flight.

17. The method of claim 16, further comprising:

determining, based on the flight data, trajectory information for one or more of the aerial vehicles; and using the determined trajectory information as a further basis for selecting the at least one aerial vehicle with which the ground station should establish the backhaul link to the airborne network.

18. The method of claim 16, further comprising:

determining link capacity information corresponding to one or more of the aerial vehicles; and using the determined link capacity information as a further basis for selecting the at least one aerial vehicle with which the ground station should establish the backhaul link to the airborne network.

19. The method of claim 16, further comprising:

determining a measure of demand for backhaul resources corresponding to the at least one ground station; and using the measure of demand for backhaul resources as a further basis for selecting the at least one aerial vehicle with which the ground station should establish the backhaul link to the airborne network.

20. The method of claim 16, further comprising:

using two or more of: (a) trajectory information for one or more of the aerial vehicles, (b) link capacity information corresponding to one or more of the aerial vehicles, and (c) demand for backhaul resources, as further bases for selecting the at least one aerial vehicle with which the ground station should establish the backhaul link to the airborne network.

21. The method of claim 16, wherein at least a portion of the aerial vehicles are operable to move about such that a coverage area of each such aerial vehicle changes over time, the method further comprising, periodically repeating the method of claim 16 to update the aerial vehicle that is selected for the given ground station.

* * * * *